(12) United States Patent
Mishina et al.

(10) Patent No.: US 6,863,234 B2
(45) Date of Patent: Mar. 8, 2005

(54) SEATBELT RETRACTOR

(75) Inventors: Joji Mishina, Tokyo (JP); Yasushi Kanamori, Tokyo (JP); Masahiro Shiotani, Tokyo (JP)

(73) Assignee: Takata Corporation, Tokyo (JP)

( * ) Notice: Subject to any disclaimer, the term of this patent is extended or adjusted under 35 U.S.C. 154(b) by 77 days.

(21) Appl. No.: 09/963,388

(22) Filed: Sep. 27, 2001

(65) Prior Publication Data

US 2002/0038834 A1 Apr. 4, 2002

(30) Foreign Application Priority Data

Sep. 29, 2000 (JP) ........................................ 2000-298157

(51) Int. Cl.⁷ ............................................. B60R 22/28
(52) U.S. Cl. ................................................. 242/379.1
(58) Field of Search ....................... 242/379.1; 280/805, 280/806; 297/470, 471, 472, 478

(56) References Cited

U.S. PATENT DOCUMENTS

| 3,610,018 | A | * | 10/1971 | Swanson et al. ............... 72/348 |
| 5,203,742 | A | * | 4/1993 | Grady ........................... 470/63 |
| 6,029,924 | A | | 2/2000 | Ono et al. ................. 242/379.1 |
| 6,367,729 | B1 | * | 4/2002 | Inagawa et al. .......... 242/379.1 |
| 2001/0006203 | A1 | * | 7/2001 | Mishina et al. ........... 242/379.1 |

FOREIGN PATENT DOCUMENTS

| EP | 1 090 820 A1 | 4/2001 |
| WO | WO00/64711 | * 11/2002 |

* cited by examiner

Primary Examiner—John M. Jillions
(74) Attorney, Agent, or Firm—Foley & Lardner LLP

(57) ABSTRACT

A seat belt retractor configured to prevent the occurrence of backlash between the torsion bar and a member to which the same is fitted even when a force is applied to the torsion bar when rotation of the retractor is locked. Backlash preventing ribs are provided on the inner peripheral surfaces of the axial hole of the reel on the sides which not subject to a large force between the reel and the torsion bar. Therefore, since a large force generated when rotation of the locking base of the locking mechanism in the webbing unwinding direction is locked is not applied to these backlash preventing ribs the collapse of the backlash preventing ribs caused by such a force can be prevented.

8 Claims, 5 Drawing Sheets

SEATBELT RETRACTOR

BACKGROUND

The present invention relates to a seatbelt retractor that winds and unwinds the webbing of the seat belt. More specifically, the present invention relates to a seatbelt retractor that includes an energy absorbing mechanism (EA mechanism) that restrains a load applied to the webbing by a torsion bar when the unwinding of the seatbelt is prevented in case of emergency such as a crash in which a large extent of deceleration of the vehicle is affected with the webbing fastened.

Hitherto, the seatbelt apparatus mounted on the vehicle such as automotive vehicles prevents jumping out of the passenger from the seat and thus protects the passenger by restraining the passenger with webbing in case of emergency described above.

Such a seatbelt apparatus is provided with a seatbelt retractor for winding the webbing. In the seatbelt retractor, the webbing is wound on the reel when it is not used, but pulled out and fastened on the passenger when it is used. In the seatbelt retractor, the locking mechanism is actuated in case of emergency as described above to prevent rotation of the reel in the unwinding direction, and thus unwinding of the webbing is prevented. Therefore, the passenger is positively restrained and protected in case of emergency.

Incidentally, in the seatbelt retractor of the conventional seatbelt apparatus, when the webbing restrains and protects the passenger in case of emergency such as a crash of the vehicle, a large extent of deceleration of the vehicle occurs and thus the passenger is apt to move forward by large inertia. Therefore, the webbing is applied with a large load and the passenger is applied with a large impact from the webbing. Though the large impact is a minor matter for the passenger, it is preferable to be restrained if it is possible.

Therefore, various seatbelt retractors comprising an EA mechanism for restraining a load applied to the webbing by a torsion bar in case of emergency with the webbing fastened has been conventionally proposed.

In the seatbelt retractor comprising an EA mechanism, the reel for winding the webbing and the locking base of the locking mechanism for locking the rotation of the reel in the webbing unwinding direction in case of emergency are rotatably (so as to be capable of transmitting a torque) connected by a torsion bar. When the locking mechanism is actuated in case of emergency, rotation of the locking base in the webbing unwinding direction is prevented, but the torsion bar is twisted because unwinding of the webbing due to inertia of the passenger makes the reel rotate in the webbing unwinding direction. Subsequently, the reel rotates in the webbing unwinding direction while twisting the torsion bar, and a load applied to the webbing by a torsional torque of the torsion bar is restricted and thus the impact applied to the passenger is absorbed and alleviated.

When the torsion bar is rotatably connected to the reel and the locking base, axial holes of hexagonal cross section are respectively formed at the center positions of the reel and the locking base, and torque transmitting shafts of hexagonal cross section are respectively provided on the torsion bar at the position where the reel and the locking base are rotationally connected, so that the torque transmitting shafts are press-fined into the axial holes on the reel and the locking base. In this case, in order to prevent backlash at the time of press-fitting, three backlash preventing ribs i, j, k are conventionally provided respectively at the centers of the three sides c, e, g, which are not adjacent, out of six arc-shaped sides c, d, e, f g, and h of the axial hole b having a hexagonal cross section formed on the reel a as shown in FIG. 7, for example, to fix and support the torsion bar m. Likewise, three backlash preventing ribs are also formed on the center positions of three arc-shaped sides of the axial hole having hexagonal cross section formed on the locking base, though it is not shown.

However, providing backlash preventing ribs i, j, k at the center positions of the sides c, e, g of the hexagonal cross section of the axial hole b as in the conventional case has a following problem. That is, when a load is applied to the webbing at the time when the lock of the locking mechanism is actuated and the webbing is being unwound, the reel a is apt to rotate in the webbing unwinding direction CW as shown in FIG. 7, and a large force to rotate the torsion bar m is applied from the reel a to the torsion bar m. At this time, since the large force is applied to the torsion bar m via the backlash preventing ribs i, j, k at the center positions of sides c, e, g of the axial hole b, the backlash preventing ribs i, j, k are collapsed and thus a gap is generated between the reel and the torsion bar. Such a gap between the axial hole in the reel b and the torsion bar m causes backlash and thus contributes to generate squeak and rattle. Likewise, a gap is also generated between the torsion bar m and the locking base.

Therefore, it is an object of the present invention to provide a seatbelt retractor that can positively prevent backlash between the torsion bar and the member in which the torsion bar is fitted even when a large force is applied to the torsion bar when the lock of the locking mechanism is actuated.

SUMMARY OF THE INVENTION

According to the present invention a seatbelt retractor is provided. The seat belt retractor includes a reel for winding the webbing, a locking mechanism having a locking member that is prevented from rotating in the webbing unwinding direction in case of emergency, and a torsion bar provided concentrically with the reel and rotatably connecting between the reel and the locking member. The torsion bar restrains a load applied to the webbing when rotation of the locking member in the webbing unwinding direction is prevented to allow the reel to rotate a prescribed amount in the webbing unwinding direction with respect to the locking member.

The torsion bar includes a first torque transmitting shaft to be press-fitted into the axial hole on the reel and a second torque transmitting shaft press-fitted into the axial hole on the locking member. A backlash preventing portion for preventing backlash in the press-fitted state of at least one of the first torque transmitting shaft and the second torque transmitting shaft is provided on at least one of the first torque transmitting shaft and the second torque transmitting shaft. Alternatively, the preventing portion may be provided on at least one of the inner peripheral surfaces of the axial holes on the reel and the locking member at the position where a large or majority of the force generated when rotation of the locking member in the webbing unwinding direction is locked is not applied.

According to the present invention, the backlash preventing portion is a backlash preventing rib provided on at least one of the first torque transmitting shaft and the second torque transmitting shaft or on at least one of the inner peripheral surfaces of the respective axial holes on the reel and the same on the locking member so as to extend in the axial direction.

In the seatbelt retractor of the present invention of such a structure, a backlash preventing portion is provided on at least one of the first torque transmitting shaft and the second torque transmitting shaft or on at least one of the inner surfaces of the respective axial holes on the reel and the same on the locking member, at the position where a large force generated when rotation of the locking member in the webbing unwinding direction is locked is not applied. As a result, the large force generated due to the locking of the locking member (i.e., prevention of the locking member from rotating in the webbing unwinding direction) is not applied to the backlash preventing portion, and the backlash preventing portion does not collapse.

Therefore, when rotation of the locking member in the webbing unwinding direction is locked, backlash occurring at the portion between the torsion bar and the reel, and/or between the torsion bar and the locking member caused by collapse of the backlash prevention portion is prevented. Thus, squeak and rattle caused by backlash are not generated.

It is to be understood that both the foregoing general description and the following detailed description are exemplary and explanatory only, and are not restrictive of the invention as claimed.

BRIEF DESCRIPTION OF THE DRAWINGS

These and other features, aspects and advantages of the present invention will become apparent from the following description, appended claims, and the accompanying exemplary embodiments shown in the drawings, which are briefly described below.

DETAILED DESCRIPTION

Figure 1:
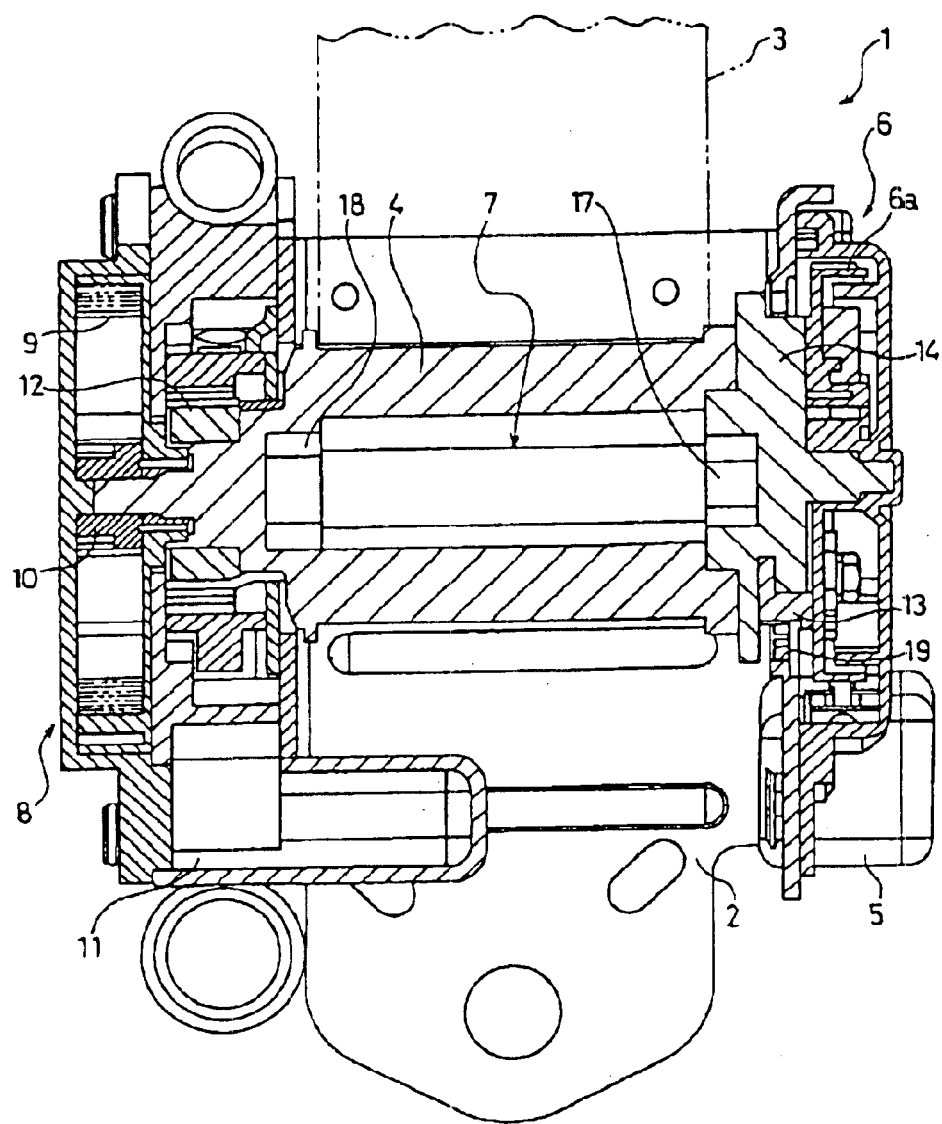
FIG. 1 is a cross sectional view showing an example of the embodiment of the seatbelt retractor according to the present invention.

Referring now to the drawings, an embodiment of the present invention will be described.

As shown in FIG. 1, a seat belt rectractor 1 having a one-side opened rectangular frame 2 is provided. The retractor is adapted to wind and unwind the webbing 3 of a seat belt. The retractor includes a reel 4 rotatably supported between the both side walls of the oneside opened rectangular frame 2 for winding the webbing 3. A deceleration sensing mechanism 5 is provided. The mechanism 5 is actuated by sensing a large deceleration generated in case of emergency described above. The retractor 1 further includes a locking mechanism 6 that is configured to be actuated by the deceleration sensing mechanism 5 for preventing at least rotation of the reel 4 in the belt unwinding direction.

A torsion bar 7 is axially disposed at the center of the reel 4 for rotatably connecting the reel 4 and the locking mechanism 6. A spring mechanism 8 is provided for urging the reel 4 in the belt winding direction. The spring mechanism 8 includes the bush 10 and a spiral spring 9. A pretensioner 11 is also provided. The pretensioner 11 is actuated in case of emergency described above for generating a belt winding torque. A bush 12 is provided for transmitting a webbing winding torque of the pretensioner 11 to the reel 4.

Each end of the torsion bar 7 includes a torque transmission shaft. At one end a second torque transmission shaft 17 is provided to be fitted into the axial hole of the locking base (i.e., the locking member) so that relative rotation relative motion between the locking member and the transmission shaft 17 is prevented. At the other end of the torsion bar 7 a first torque transmission shaft 18 is provided. The shaft 18 fits into the axial hole of the reel 4 so that relative rotation between the torsion bar 7 and the reel 4 is prevented. Preferably, the first and second torque transmission shafts 18, 17 have hexagonal cross sections having arc-shaped sides with the respective axial holes on the locking base 14 and the reel 4 having corresponding hexagonal cross sections having arc-shaped sides. The first and the second torque transmission shafts 18, 17 of the torsion bar are respectively press-fitted into the respective axial holes of the locking base 14 and the reel 4.

In the seatbelt retractor 1, the webbing 3 is completely wound by an urging force of a spring means 8 when the webbing is not fastened. When the webbing 3 is pulled out at the normal speed for fastening, the reel 4 rotates in the webbing unwinding direction and thus the webbing 3 is pulled out smoothly. After the tongue (which is not shown, but may be slidably provided on the webbing 3), is inserted and locked into the buckle fixed on the vehicle body, the portion of the webbing 3 that is excessively pulled out is wound on the reel 4 by an urging force of the spring mechanism 8. As a result, the webbing 3 is fitted to the passenger so that the passenger does not have a feeling of pressure.

In case of emergency as described above, the webbing winding torque generated by the pretensioner 11 is transmitted to the reel 4, and the reel 4 winds the webbing 3 by a prescribed amount, so that the passenger is fixedly restrained. A large deceleration generated in case of emergency activates deceleration sensing mechanism 5 to induce locking operation of the locking mechanism 6. The operation of the deceleration sensing mechanism 5 prevents rotation of lock gear 6a in the webbing unwinding direction and rotates the pawl 13 rotatably supported by the locking base 14 of the locking mechanism 6 to engage the inner tooth 19 of the sidewall of the frame 2. Thus, rotation of the locking base 14 in the webbing unwinding direction is prevented. The torsion bar 7 is twisted and only the reel 4 rotates with respect to the locking base 14 in the webbing unwinding direction. A torsional torque of the torsion bar 7 restricts a load applied to the webbing 3, and thus the impact applied to the passenger is absorbed and alleviated.

The seatbelt retractor 1 may be constructed so that the locking base 14 of the locking mechanism 6 rotates with respect to the lock gear 6a in the webbing unwinding direction when the webbing is abruptly pulled. In this situation, the pawl 13 of the locking mechanism 6 engages the inner tooth 19 of the side wall of the frame 2 to prevent rotation of the locking base 14 as described above, and rotation of the reel 4 in the unwinding direction is prevented by the torsion bar 7, thereby preventing unwinding of the webbing 3.

Figure 2:
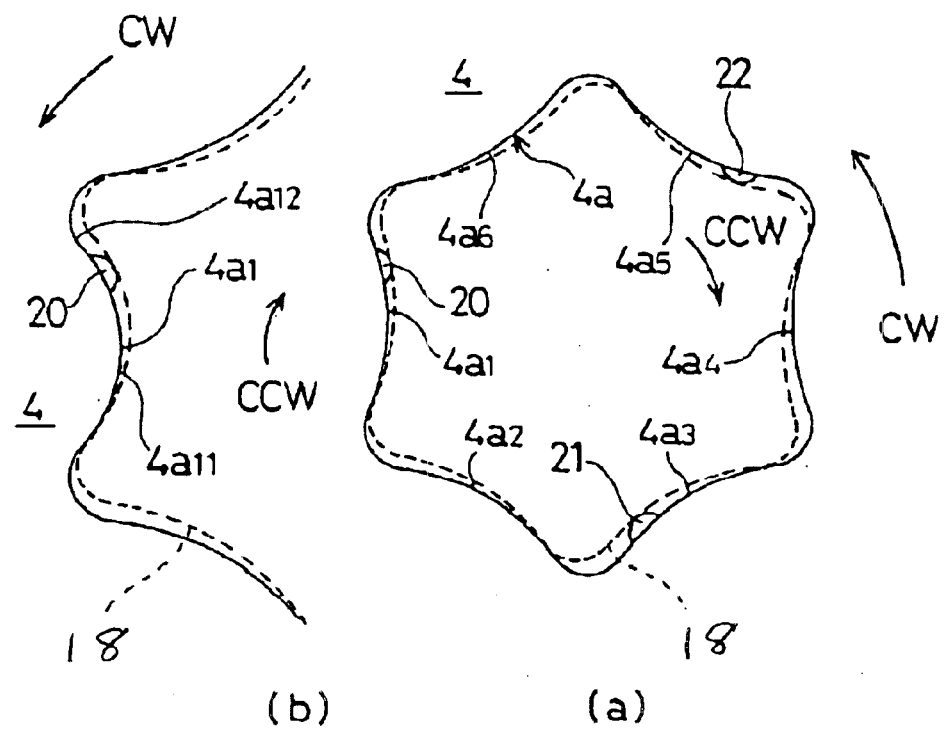
FIG. 2 is a drawing showing backlash preventing ribs of the seatbelt retractor in the example shown in FIG. 1.

As shown in FIG. 2(a) by a solid line, the reel 4 of the seatbelt retractor 1 of this example may be provided with arc-shaped sides $4a_1$, $4a_2$, $4a_3$, $4a_4$, $4a_5$, $4a_6$ forming an inner peripheral surface of the axial hole 4a of hexagonal cross section. The inner surface of the three sides $4a_1$, $4a_3$, $4a_5$ which are not adjacent with each other, may include three backlash preventing ribs (i.e. a backlash preventing portion) 20, 21, 22 having arc-shaped cross section respectively so as to extend in the axial direction of the torsion bar. The positions where the backlash preventing ribs 20, 21, 22 are provided differ from their position in a conventional retractor. The backlash preventing ribs 20, 21, 22 are not provided at the center positions of the respective sides $4a_1$, $4a_3$, $4a_5$. Instead, as shown in the enlarged view of FIG. 2(b), the backlash preventing rib 20, for example, is formed on the side $4a_1$ on the opposite side $4a_{12}$ from the side $4a_{11}$ to which a large force from the reel 4 to the torsion bar 7 is applied when the locking mechanism is locked and a load is applied and the webbing attempting to pull out.

In other words, the backlash preventing rib 20 is provided on the side $4a_{12}$ to which a large force from the reel 4 is not applied. Similarly, two other backlash preventing ribs 21, 22 are provided on the sides of the respective sides $4a_3$, $4a_5$, where a large force is not applied from the reel 4.

As shown in FIG. 2(a), three backlash preventing ribs 20, 21, 22 may be provided respectively on the respective sides 4a, $4a_3$, $4a_5$ of the axial hole 4a on the sides where a large force is not applied from the reel 4. The first torque transmitting shaft 18 of the torsion bar 7 shown by dotted lined in FIGS. 2(a) is press-fitted into the axial hole 4a. The first torque transmitting shaft 18 of the torsion bar 7 is displaced in the direction of rotation and comes to abut against the respective sides $4a_1$–$4a_6$ of the axial hole 4a on the portion of the sides to which a large force from the reel 4 is applied.

In the same manner, the same backlash preventing ribs may be provided on the three sides of the axial hole on the locking base 14 through which the second torque transmitting shaft 17 of the torsion bar 7 is press-fitted on the side on which a large force from the torsion bar 7 is not applied. Whereby the second torque transmitting shaft 17 of the torsion bar 7 is displaced in the direction of rotation and abuts against the respective sides of the axial hole of the locking base 14 on the sides to which a large force from the torsion bar 7 is applied.

Figure 3:
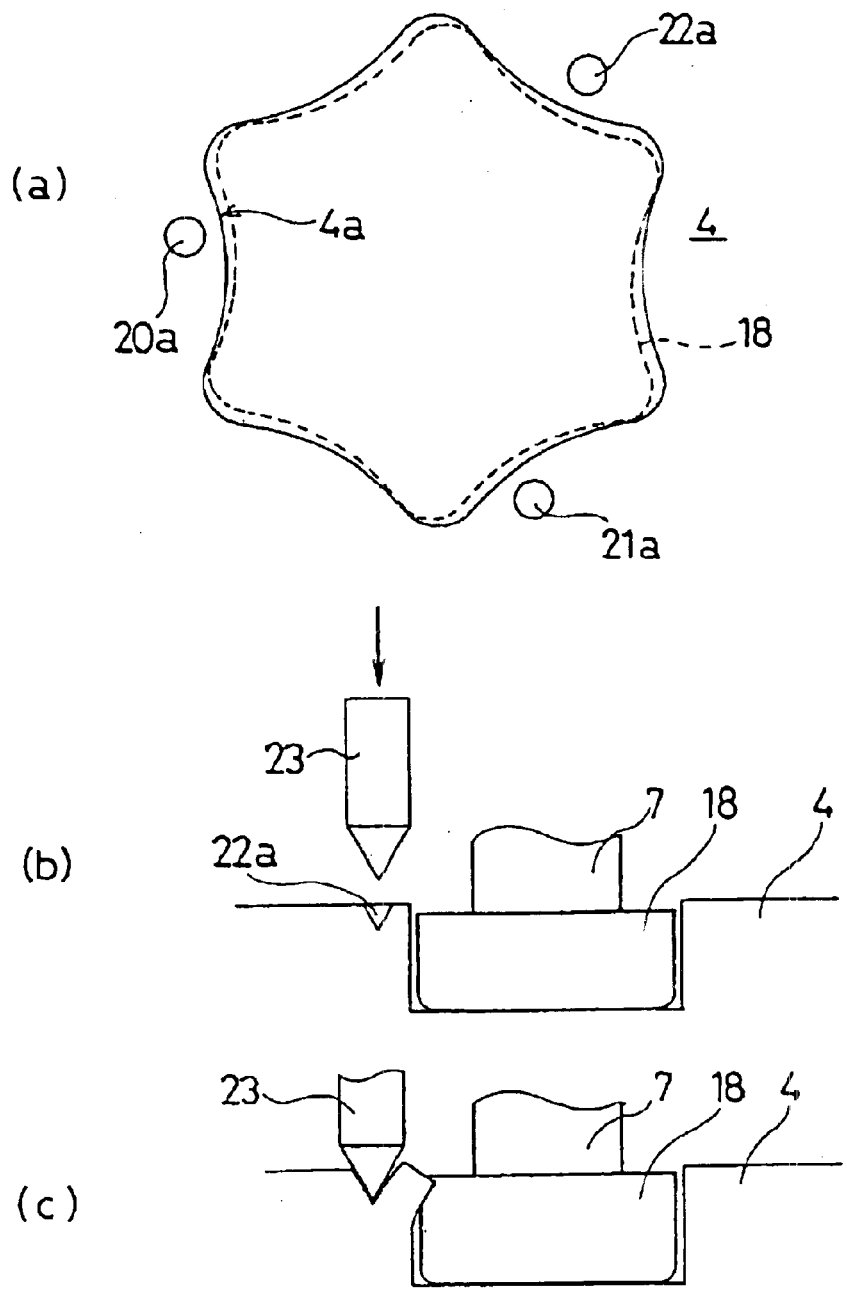
FIG. 3 is an explanatory drawing showing the formation of the backlash preventing rib shown in FIG. 2.

Such backlash preventing ribs 20, 21, 22, as shown in FIG. 3, may be formed by punching at the positions 20a, 21a, 22a in the proximity of the respective sides of the inner peripheral surface of the axial hole 4a of the reel 4 on the side to which a large force from the reel 4 is not applied by the use of a punch 23. As a result of the punching a part of the reel 4 at he peripheral edge of the axial hole 4a is moved toward the torsion bar 7.

When the locking mechanism 6 is actuated to lock rotation of the locking base 14 in the webbing unwinding direction (i.e., CW) in case of emergency or the like, a large force from the reel 4 is applied to the torsion bar 7 and a large force from the torsion bar 7 is applied to the locking base 14 as described above. At this time, a large force is directly transmitted from the reel 4 to the torsion bar 7 at the portion where the inner peripheral surface of the axial hole 4a of the reel and the outer peripheral surface of the first torque transmitting shaft 18 abut with respect to each other. The large force is not transmitted from the reel 4 to the torsion bar 7 via the backlash preventing ribs 20, 21, 22. Therefore, a large force does not act upon the backlash preventing ribs 20, 21, 22, and thus the backlash preventing ribs 20, 21, 22 are not susceptible to collapse when rotation in the webbing unwinding direction CW of the locking base 14 is locked by the activation of the locking mechanism 6.

In the same manner, when rotation of the locking base 14 in the webbing unwinding direction (i.e., CW) is locked by the locking operation of the locking mechanism 6, a large force described above is directly transmitted from the torsion bar 7 to the locking base 14 at the portion where the inner periphery of the axial hole of the locking base 14 and the outer peripheral surface of the second torque transmitting shaft 17 abut with respect to each other. The large force is not transmitted from the torsion bar 7 to the locking base 14 via the backlash preventing rib. Therefore, a large force does not act upon the backlash preventing rib formed on the inner peripheral surface of the axial hole of the locking base 14. Thus, these backlash preventing ribs are not susceptible to collapse when rotation in the webbing unwinding direction CW of the locking base 14 is locked by the activation of locking mechanism 6.

The backlash preventing ribs associated with the press fitted connections between the torsion bar 7 and the reel 4 and the torsion bar 7 and locking base 14 are preferably located at positions where the majority of the force generated due to the rotation of the locking base 14 in the webbing unwinding direction CW being locked is not applied. As a result, the collapse of the backlash preventing ribs caused by this force may be prevented. Therefore, occurrence of backlash between the torsion bar 7 and the reel 4, and between the torsion bar 7 and the locking base 14 caused by the collapse of the backlash preventing ribs can be prevented, thereby preventing squeak and rattle.

Figure 4:
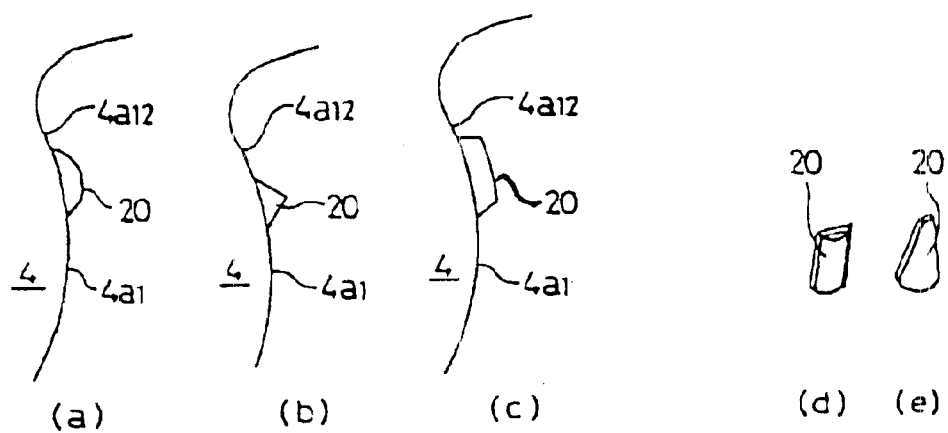
FIGS. 4(a), 4(b) and 4(c) are drawings each showing an alternative example of the cross sectional configuration of the backlash preventing rib, and FIGS. 4(d) and (e) are drawings each showing an example of the configuration of the backlash preventing rib along the axis.

The cross section of the backlash preventing rib may be, in addition to the arc-shaped cross section described above, other configurations such as the arc of the oval or the arc of the elongated circle in cross section as shown in FIG. 4(a), the triangular cross section as shown in FIG. 4(b), or the trapezoidal cross section, square cross section, or rectangular cross section as shown in FIG. 4(c). In addition, the configuration along the axis of the backlash preventing rib may have the constant width as shown in FIG. 4(d) or the configuration with axially continuously varying width as shown in FIG. 4(e).

Figure 5:
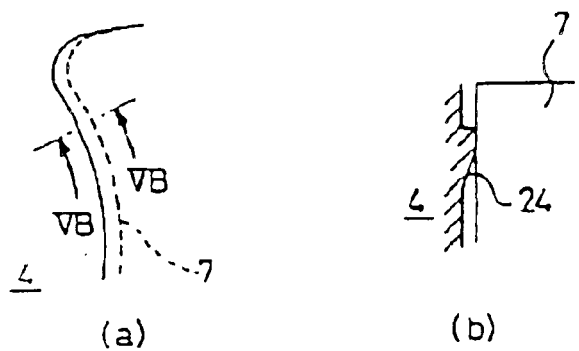
FIG. 5 is a drawing showing another example of the backlash preventing portion of the present invention.

Instead of the backlash preventing rib, as shown in FIG. 5, a backlash preventing tapered portion 24 for guiding to displace the torsion bar 7 in the direction of rotation as described above may be provided on the inner peripheral surface of the axial hole on the reel 4 and on the locking base 14.

Figure 6:
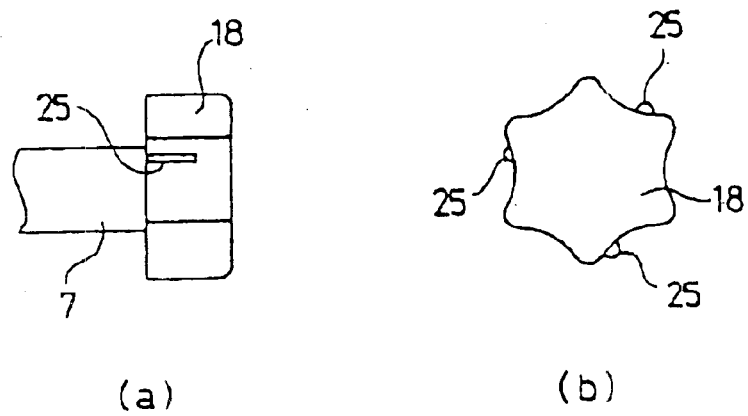
FIG. 6 shows other possible position of the backlash preventing rib of the present invention, wherein (a) is a partial front view, and (b) is a right side view of (a).
Figure 7:
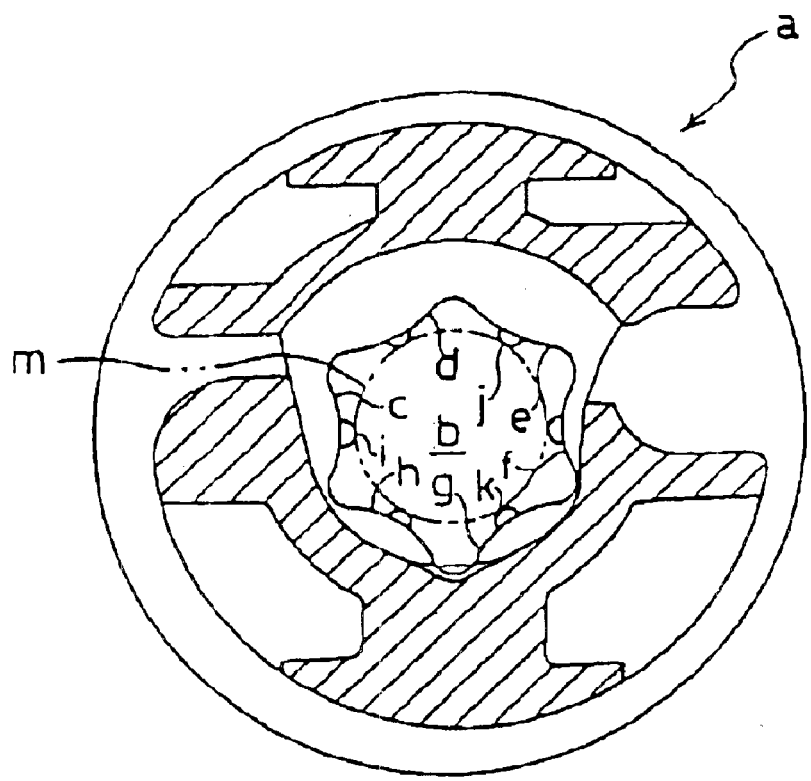
FIG. 7 is an explanatory drawing showing backlash preventing ribs on the conventional seatbelt retractor.

Alternatively, instead of providing the backlash preventing rib on the reel 4 and on the locking base 14, as shown in FIGS. 6(a) and (b), the backlash preventing rib 25 may be provided on the first and the second torque transmitting shafts 18, 17 of the torsion bar 7.

In addition, the cross section of the axial hole on the reel 4 and on the locking base 14 and the cross section of the first and the second torque transmitting shafts 18, 17 are not limited to the hexagonal shape, but it may be any cross sectional configurations so long as the first and the second torque transmitting shafts 18, 17 can be rotatably fitted into the axial hole to connect them with each other.

As is apparent from the description above, in the seatbelt retractor of the present invention, since the backlash preventing portion is provided on at least one of the first torque transmitting shaft and the second torque transmitting shaft, or at least one of the inner peripheral surfaces of the respective axial holes on the reel and on the locking member at the position to which a large force generated when rotation of the locking member in the webbing unwinding direction is locked is not applied, the collapse of the backlash preventing portion by such a force may be prevented. Therefore, it is ensured that occurrence of backlash at least one of the portion between the torsion bar and the reel, and between the torsion bar and the locking base is prevented by the collapse of the backlash preventing portion, and thus generation of squeak and rattle caused by backlash may also be prevented.

The priority document, Japanese Patent Application No. 2000-298157 filed Sep. 29, 2001, is incorporated by reference herein in its entirety.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

We claim:

1. A seat belt retractor comprising:
  a reel for winding the webbing;
  a locking mechanism connected to the reel by a torsion bar;
  wherein the locking mechanism is configured to be prevented from rotating in order to prevent the webbing from withdrawing from the reel;
  wherein one end of the torsion bar is press fitted into a hole in the reel and the other end of the torsion bar is press fitted into a hole in the locking mechanism;
  wherein a rib to prevent backlash is positioned in the hole in at least one of the reel and the locking mechanism at a location not subjected to the majority of the force applied between the at least one of the reel and the locking mechanism and the torsion bar when rotation of the locking mechanism is prevented; and
  wherein the rib includes an arc-shaped cross section.

2. The retractor of claim 1 wherein the cross-section of the rib varies in width in the axial direction.

3. The seat belt retractor according to claim 1 wherein the cross section of the rib includes a constant width in the axial direction.

4. A seat belt retractor comprising:
  a reel for winding the webbing;
  a locking mechanism connected to the reel by a torsion bar;
  wherein the locking mechanism is configured to be prevented from rotating in order to prevent the webbing from withdrawing from the reel;
  wherein one end of the torsion bar is press fitted into a hole in the reel and the other end of the torsion bar is press fitted into a hole in the locking mechanism;
  wherein a backlash preventing structure is positioned in the hole in at least one of the reel and the locking mechanism at a location not subjected to the majority of the force applied between the at least one of the reel and the locking mechanism and the torsion bar when rotation of the locking mechanism is prevented; and
  wherein the backlash preventing structure includes a tapered portion located in the locking mechanism and projecting toward the end of the torsion bar located in the hole.

5. A seat belt retractor comprising:
  a reel for winding the webbing;
  a locking mechanism connected to the reel by a torsion bar;
  wherein the locking mechanism is configured to be prevented from rotating in order to prevent the webbing from withdrawing from the reel;
  wherein one end of the torsion bar is press fitted into a hole in the reel and the other end of the torsion bar is press fitted into a hole in the locking mechanism;
  wherein a backlash preventing structure is positioned in the hole in at least one of the reel and the locking mechanism at a location not subjected to the majority of the force applied between the at least one of the reel and the locking mechanism and the torsion bar when rotation of the locking mechanism is prevented; and
  wherein the backlash preventing structure includes a tapered portion located in the reel and projecting toward the end of the torsion bar located in the hole.

6. A seat belt retractor comprising:
  a reel for winding a webbing;
  a locking mechanism connected to the reel by a torsion bar;
  wherein the locking mechanism is configured to be prevented from rotating in order to prevent the webbing from withdrawing from the reel;
  wherein one end of the torsion bar is press fitted into a hole in the reel and the other end of the torsion bar is press fitted into a hole in the locking mechanism;
  wherein a rib to prevent backlash is positioned in the hole in at least one of the reel and the locking mechanism at a location not subjected to the majority of the force applied between the at least one of the reel and the locking mechanism and the torsion bar when rotation of the locking mechanism is prevented; and
  wherein the rib includes a quadrilateral cross section.

7. The seat belt retractor according to claim 6, wherein the cross section of the rib includes a constant width in the axial direction.

8. The seat belt retractor according to claim 6, wherein the cross section of the rib varies in width in the axial direction.

* * * * *